(12) United States Patent
Scholand et al.

(10) Patent No.: US 10,003,990 B2
(45) Date of Patent: Jun. 19, 2018

(54) COMMUNICATION DEVICE AND METHOD FOR TRANSMITTING DATA IN ACCORDANCE WITH A RETRANSMISSION PROTOCOL

(71) Applicant: Intel Corporation, Santa Clara, CA (US)

(72) Inventors: Tobias Scholand, Duisburg (DE); Roland Hellfajer, Bochum (DE); Chandra Prakash Gupta, Bochum (DE)

(73) Assignee: INTEL CORPORATION, Santa Clara, CA (US)

( * ) Notice: Subject to any disclaimer, the term of this patent is extended or adjusted under 35 U.S.C. 154(b) by 325 days.

(21) Appl. No.: 14/314,042

(22) Filed: Jun. 25, 2014

(65) Prior Publication Data

US 2015/0381321 A1 Dec. 31, 2015

(51) Int. Cl.
| | | |
|---|---|---|
| H04W 24/10 | (2009.01) | |
| H04L 5/00 | (2006.01) | |
| H04W 60/00 | (2009.01) | |
| H04W 52/02 | (2009.01) | |
| H04L 1/18 | (2006.01) | |

(Continued)

(52) U.S. Cl.
CPC .......... *H04W 24/10* (2013.01); *H04L 1/1887* (2013.01); *H04B 1/0053* (2013.01); *H04B 1/0067* (2013.01); *H04L 1/0003* (2013.01); *H04L 1/0026* (2013.01); *H04L 1/1803* (2013.01); *H04L 1/1812* (2013.01); *H04L 1/1819* (2013.01); *H04L 1/1854* (2013.01); *H04L 1/1867* (2013.01); *H04L 5/001* (2013.01); *H04L 5/0041* (2013.01); *H04L 27/2647* (2013.01); *H04L 2001/0093* (2013.01); *H04W 36/0077* (2013.01); *H04W 36/0094* (2013.01); *H04W 36/08* (2013.01); *H04W 36/14* (2013.01); *H04W 36/38* (2013.01); *H04W 52/0206* (2013.01); *H04W 52/0238* (2013.01); *H04W 52/0245* (2013.01); *H04W 52/34* (2013.01); *H04W 56/0005* (2013.01); *H04W 56/0045* (2013.01);

(Continued)

(58) Field of Classification Search
None
See application file for complete search history.

(56) References Cited

U.S. PATENT DOCUMENTS 9,549,327 B2 * 1/2017 Kim ............... H04J 11/0056
2003/0039204 A1 * 2/2003 Tiedemann, Jr. ...... H04J 13/18
370/209

(Continued)

*Primary Examiner* — Andrew Oh
(74) *Attorney, Agent, or Firm* — Viering, Jentschura & Partner mbB

(57) ABSTRACT

A communication device is described comprising a transmitter configured to transmit data according to a retransmission protocol, a determiner configured to determine whether, for a transmission time scheduled according to the retransmission protocol, there was a transmission gap within a predetermined time interval before the transmission time or to determine whether there will be a transmission gap within a predetermined time interval after the transmission time and a controller configured to control the transmitter to perform an initial transmission of data or a retransmission of data according to the retransmission protocol at the transmission time based on the result of the determination.

13 Claims, 5 Drawing Sheets

(51) Int. Cl.
   *H04W 36/38* (2009.01)
   *H04W 56/00* (2009.01)
   *H04W 36/00* (2009.01)
   *H04L 1/00* (2006.01)
   *H04W 36/14* (2009.01)
   *H04B 1/00* (2006.01)
   *H04W 88/06* (2009.01)
   *H04W 52/34* (2009.01)
   *H04L 27/26* (2006.01)
   *H04W 72/02* (2009.01)
   *H04W 36/08* (2009.01)

(52) U.S. Cl.
   CPC .......... *H04W 60/005* (2013.01); *H04W 72/02* (2013.01); *H04W 88/06* (2013.01)

(56) References Cited

U.S. PATENT DOCUMENTS

| | | | | |
|---|---|---|---|---|
| 2003/0108027 A1* | 6/2003 | Kim | H04L 1/1854 | 370/345 |
| 2008/0205329 A1* | 8/2008 | Dominique | H04L 25/067 | 370/328 |
| 2009/0059854 A1* | 3/2009 | Nishio | H04W 24/10 | 370/329 |
| 2009/0092107 A1* | 4/2009 | Cai | H04W 24/10 | 370/338 |
| 2009/0235139 A1* | 9/2009 | Park | H04L 1/1819 | 714/750 |
| 2010/0008348 A1* | 1/2010 | Zhang | H04L 1/1887 | 370/345 |
| 2010/0034126 A1* | 2/2010 | Kitazoe | H04W 74/085 | 370/310 |
| 2012/0054573 A1* | 3/2012 | Kanemoto | H04L 1/1812 | 714/748 |
| 2012/0094651 A1* | 4/2012 | Chun | H04W 36/0027 | 455/422.1 |
| 2012/0113938 A1* | 5/2012 | Larsson | H04W 74/008 | 370/329 |
| 2012/0155310 A1* | 6/2012 | Kreuzer | H04W 52/146 | 370/252 |
| 2012/0176887 A1* | 7/2012 | Mcbeath | H04L 1/1822 | 370/216 |
| 2012/0230272 A1* | 9/2012 | Kim | H04L 1/1861 | 370/329 |
| 2012/0281563 A1* | 11/2012 | Comsa | H04W 24/10 | 370/252 |
| 2013/0163533 A1* | 6/2013 | Anderson | H04W 72/04 | 370/329 |
| 2013/0163534 A1* | 6/2013 | Anderson | H04L 1/0026 | 370/329 |
| 2013/0163535 A1* | 6/2013 | Anderson | H04W 72/04 | 370/329 |
| 2013/0163537 A1* | 6/2013 | Anderson | H04W 72/1284 | 370/329 |
| 2013/0242842 A1* | 9/2013 | Wong | H04W 72/005 | 370/312 |
| 2013/0260820 A1* | 10/2013 | Schmandt | H04W 72/1215 | 455/553.1 |
| 2013/0324112 A1* | 12/2013 | Jechoux | H04W 72/1215 | 455/426.1 |
| 2013/0329631 A1* | 12/2013 | Alam | H04W 52/362 | 370/328 |
| 2014/0044082 A1* | 2/2014 | Iwamura | H04L 1/1812 | 370/329 |
| 2014/0080506 A1* | 3/2014 | Siomina | H04W 64/00 | 455/456.1 |
| 2014/0098752 A1* | 4/2014 | Venkata | H04W 52/146 | 370/329 |
| 2014/0105149 A1* | 4/2014 | Lindoff | H04L 1/0003 | 370/329 |
| 2014/0187283 A1* | 7/2014 | Nimbalker | H04W 72/048 | 455/550.1 |
| 2014/0198664 A1* | 7/2014 | Chen | H04L 1/189 | 370/241 |
| 2014/0301339 A1* | 10/2014 | Sesia | H04B 1/0067 | 370/329 |
| 2015/0016282 A1* | 1/2015 | Su | H04W 36/0088 | 370/252 |
| 2015/0050890 A1* | 2/2015 | Axmon | H04W 24/08 | 455/67.11 |
| 2015/0054683 A1* | 2/2015 | Hryciuk | G01S 5/0081 | 342/357.51 |
| 2015/0110026 A1* | 4/2015 | Lee | H04B 7/2656 | 370/329 |
| 2015/0131536 A1* | 5/2015 | Kaur | H04L 5/001 | 370/329 |
| 2015/0188793 A1* | 7/2015 | Zhao | H04W 76/048 | 370/242 |
| 2015/0264683 A1* | 9/2015 | Kim | H04L 5/0007 | 370/329 |
| 2015/0271723 A1* | 9/2015 | Yang | H04W 36/08 | 455/436 |
| 2015/0289153 A1* | 10/2015 | Gopal | H04W 24/08 | 455/436 |
| 2015/0312007 A1* | 10/2015 | Yang | H04L 1/1854 | 370/329 |
| 2015/0327159 A1* | 11/2015 | Gude | H04W 48/18 | 455/434 |
| 2015/0373671 A1* | 12/2015 | Yang | H04W 72/02 | 455/450 |
| 2016/0036542 A1* | 2/2016 | Gong | H04W 24/10 | 370/329 |
| 2016/0192385 A1* | 6/2016 | Tooher | H04L 5/0051 | 370/336 |

* cited by examiner

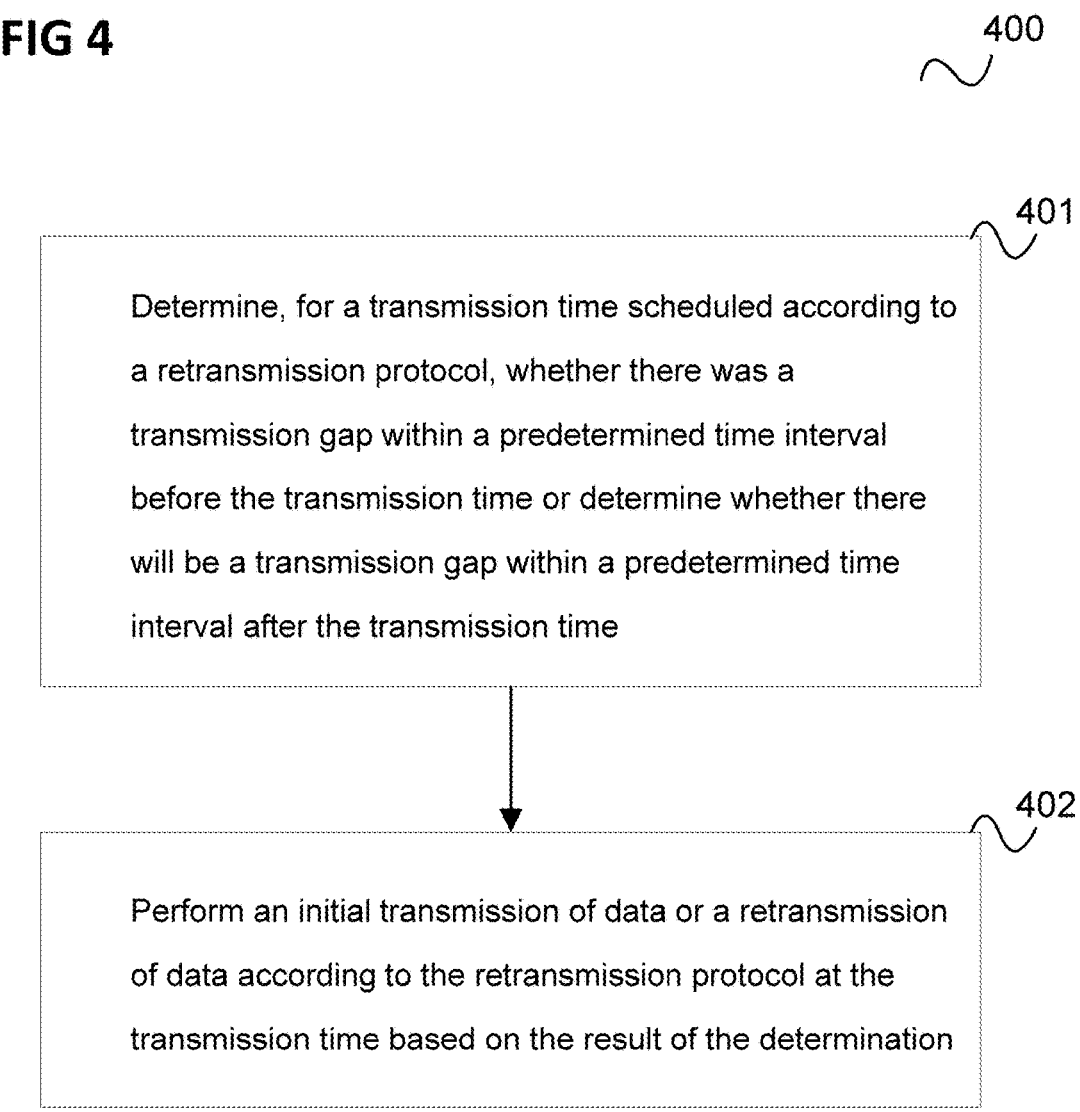

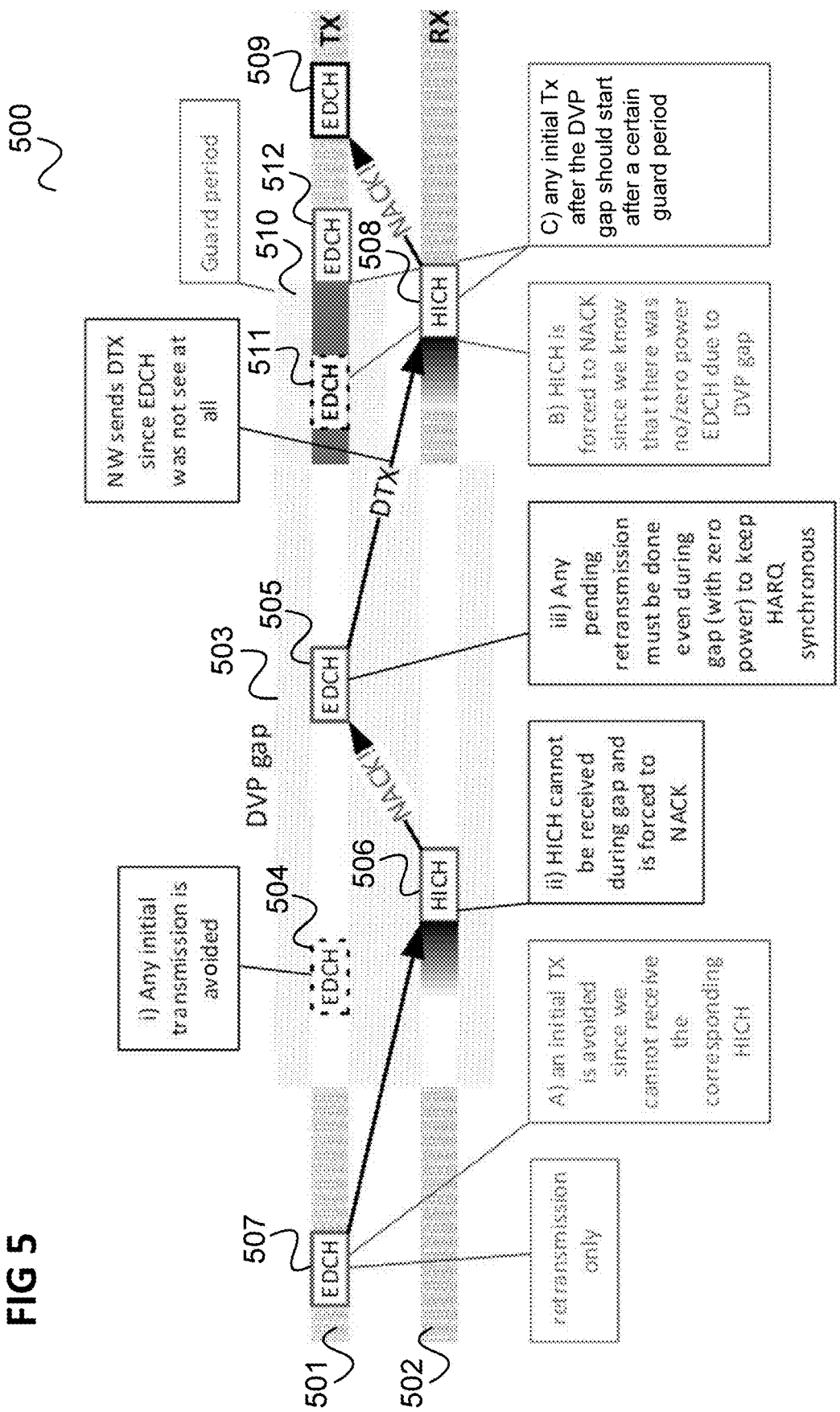

COMMUNICATION DEVICE AND METHOD FOR TRANSMITTING DATA IN ACCORDANCE WITH A RETRANSMISSION PROTOCOL

TECHNICAL FIELD

Embodiments described herein generally relate to communication devices and methods for transmitting data in accordance with a retransmission protocol.

BACKGROUND

A mobile terminal may support the usage of a plurality of subscriber identity modules at the same time such that a user may use different communication networks as home networks. The mobile terminal may even support that it can be reached via one of the networks while it has an ongoing communication via another one of the networks. This may be achieved by introducing transmission (and reception) gaps into the communication. However, transmission gaps within a communication typically have a negative impact on the performance of the communication. Accordingly, approaches are desirable to keep this negative impact low.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 4 shows a flow diagram illustrating a method for transmitting data in accordance with a retransmission protocol.

FIG. 5 shows a transmission diagram illustrating a HSUPA data transmission in the presence of a DVP transmission gap which is considered by the mobile terminal for TTIs following and preceding the transmission gap.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
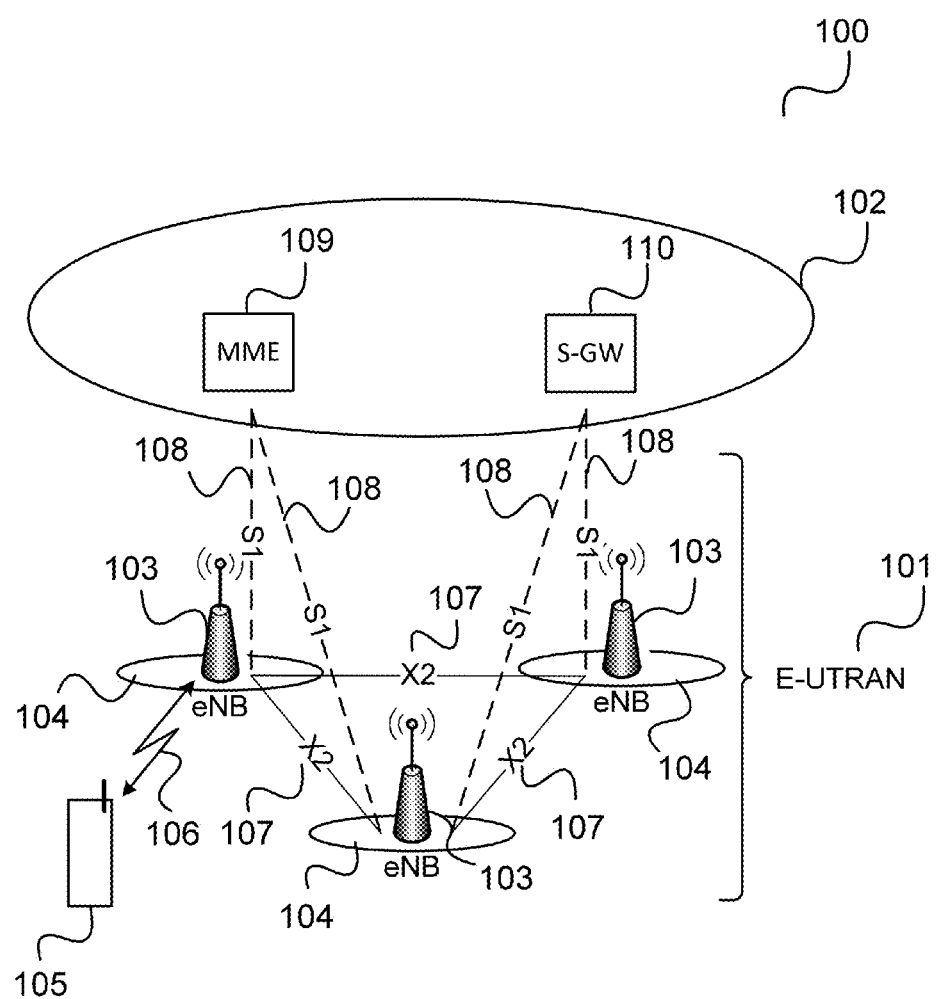
FIG. 1 shows a communication system according to a mobile communication standard, such as LTE.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Telecommunications System) Terrestrial Radio Access Network according to LTE (Long Term Evolution), or LTE-Advanced or an UTRAN according to a 3G communication system) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

The radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104)

it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

The mobile terminal 105 may include a subscriber identity module (e.g. implemented by a chip card) that allows the mobile terminal 105 to identify itself as a subscriber of the communication network formed by the radio access network 101 and the core network 102 and thus use the communication network as a home network. The subscriber identity module is for example a SIM (Subscriber Identity Module) in case the communication network is a GSM communication network or a USIM in case the communication network is a UMTS communication network.

In practice, a plurality of communication networks including a radio access network 101 and a core network 102 as described above are provided by different operators such that the coverage areas of the communication networks overlap, i.e. a mobile terminal may be located within a radio cell 104 operated by a base station 103 belonging to a first communication network of a first operator and at the same time be located within a radio cell 104 operated by a base station 103 belonging to a second communication network of a second operator. For being able to use both the first communication network and the second communication network as home networks (and not being forced to roam in case the mobile terminal is located in the coverage area of only one of the communication networks and having only an identity module of the other communication network), the mobile terminal may include two identity modules.

Accordingly, in today's handset market there is a high user demand for a handset to support multiple subscriber identity modules at the same time since this allows the user to use different SIMs for different mobile services without exchanging the SIM physically. Especially in certain countries like China this had become a key feature.

Further, it is typically expected that these subscriber identity modules can be used in parallel e.g. such that each subscriber identity module is registered with a respective network in order to be able to receive a mobile terminated call when any one of the subscriber identity modules is paged by its corresponding network.

In early implementations the reception for a subscriber identity module was stopped when another subscriber identity module was actively used by the user e.g. for circuit switched voice or for packet data connectivity. It was accepted that the terminal was not reachable under the subscriptions corresponding to the subscriber identity modules besides the one actively used until the user triggered activity on the actively used subscriber identity module was stopped.

With the wide usage of smartphones, mobile phones almost constantly use packet data connectivity even without a direct activation by the user. Thus, it is typically desired to be able to receive a paging request for a subscriber identity module while there is activity for another subscriber identity module like HSDPA/HSUPA (high speed downlink/uplink packet access) packet data connectivity in case of a 3G communication system.

For this, a feature (termed Data versus Paging (DVP) in the following) may be used according to which the communication (reception and transmission) for one subscriber identity module is balanced versus the paging activity of another subscriber identity module by creating transmission gaps. Typically, DVP is supported by introducing artificial DVP gaps to the receive (RX) and transmit (TX) signals of the active subscriber identity module, i.e. by introducing transmission gaps in a communication connection used by means of a subscriber identity module (referred to as the active subscriber identity module), in other words a communication connection provided for a subscriber identity module, i.e. provided for a network usage under the subscription corresponding to the subscriber identity module. The network (e.g. the base station) corresponding to the active subscriber identity module typically does not know about this DVP gap. Thus, its communication performance with the mobile terminal may deteriorate/suffer if this DVP gap is not handled with care by the mobile terminal. The other subscriber identity modules may use the DVP gaps to receive a potential paging from their networks.

According to HSUPA, a synchronous HARQ scheme is used in such a way that every data transmitted in a TTI (Transmission Time Interval) gets acknowledged by the network via the E-HICH (HARQ Acknowledgement Indicator Channel; HSUPA feedback channel) after a fixed time.

Figure 2:
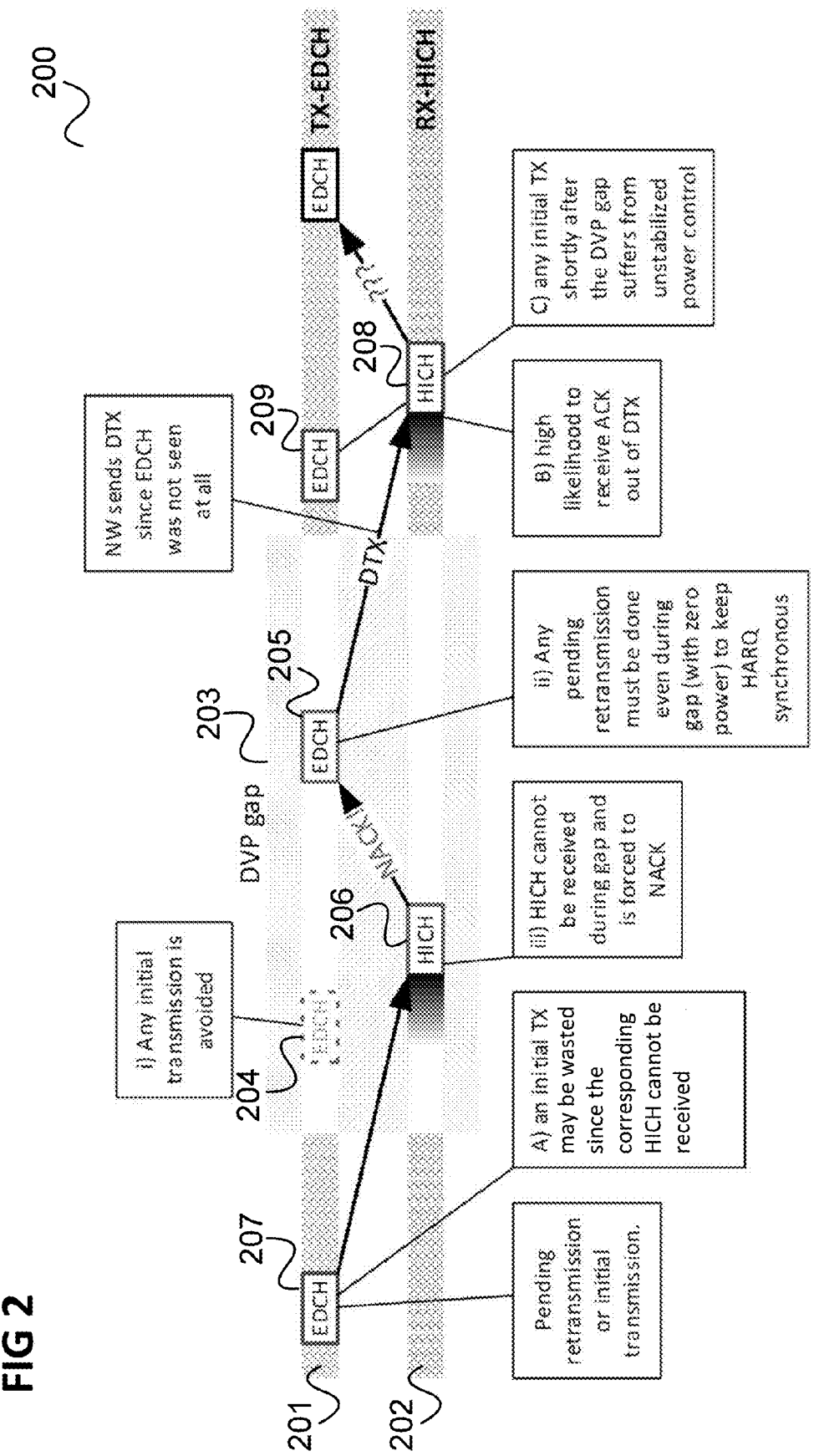
FIG. 2 shows a transmission diagram illustrating a HSUPA data transmission in the presence of a DVP transmission gap.

FIG. 2 shows a transmission diagram 200 illustrating a HSUPA data transmission in the presence of a DVP transmission gap 203.

The transmission diagram 200 shows, along a top sub-diagram 201, the activity of the transmitter of the mobile terminal (e.g. corresponding to mobile terminal 105) on the EDCH (Enhanced Uplink Dedicated Channel) and, along a second sub-diagram 202, the activity of the receiver of the mobile terminal on the HICH. Time flows from left to right in FIG. 2.

The mobile terminal may consider the DVP transmission gap 203 for the HSUPA (EDCH) transmission and (HICH) reception. This may be done in such a way that (i) the mobile terminal's physical layer (PHY) is not transmitting HSUPA data in TTIs overlapping with the transmission gap 203 as illustrated by a first transmission 204 (during one TTI) which is omitted.

This allows prohibiting initial transmissions during the DVP gap 203. An initial transmission is understood as the first transmission of a certain set of data in a HARQ process (or generally in a retransmission protocol transmission process) which may be followed by one or more retransmissions depending on whether the transmission and possible retransmissions have been successful. Due to the nature of synchronous HARQ any retransmissions cannot be prohibited but (ii) can be made with zero TX power as illustrated by a second transmission 205 during the DVP gap 203. In addition, (iii) the mobile terminal considers any HSUPA HICH reception during the DVP gap 203 as NACK (not acknowledged) as illustrated by a first HICH reception 206 during the DVP gap 203.

However, (A) in the approach (including (i), (ii) and (iii)) data transmitted in a certain TTI before the gap as illustrated by a third transmission 207 cannot receive an ACK (acknowledge) because the corresponding HICH reception overlaps with the gap 203. This may be quite suboptimal for an initial transmission since such a transmission must be followed by a corresponding retransmission which can degrade the HARQ performance.

Further, (B) if a transmission during the gap 203 was suppressed (in this example the first transmission 205) the corresponding HICH reception after the gap 203 illustrated by a second reception 208 may wrongly detect the network's missing response (referred to as DTX) to the second transmission 205 as an ACK. Higher layer RLC (radio link control) layer performance could degrade much from such a false ACK event when the HICH receiver performs a miss detection (e.g. detects an ACK from DTX). In this case, the handset does not retransmit the data which leads to a soft bit buffer corruption on the network side and corresponding protocol HARQ failure.

Additionally, (C) after the DVP gap 203 it typically takes some time for the network to stabilize the handset's transmission power since closed loop power control was broken during the DVP gap 203. Thus, an initial transmission in a HSUPA TTI shortly after the gap 203, as illustrated by the fourth transmission 209 can have degraded performance and a low likelihood to get an ACK by the network.

The effects of iii), A), B) and C) may be considered to be mitigated by the HARQ protocol e.g. by retransmitting affected transmissions since the HARQ of the 3GPP standard already includes mechanisms to cover those issues. Nevertheless, 3GPP assumes a certain likelihood of these issues and mitigation typically only works within that limits. In addition 3GPP assumes that these issues are not correlated and can be mitigated separately. As an example, let an individual error likelihood be e.g. $10^{-2}$ that the network cannot receive an EDCH transmission and $10^{-2}$ that an HICH reception has an error.

The likelihood that a TTI transmission suffers jointly from both of these issues is down to $10^{-4}$. Hence any missing mitigation of this joint issue is experienced quite seldomly.

However, the introduction of DVP can introduce a systematic correlation between these issues. Since the DVP gap 203 interrupts both transmission and reception the likelihood that the network cannot receive the EDCH transmission and that the HICH is DTX is 100% when both TTI transmission and HICH reception are within the DVP gap 203. Similar effects may occur for other issues due to (i), (ii), (iii), (A), (B) and (C).

A network may mitigate such joint issues (although that this is neither required nor specified by 3GPP). Live network trials show different robustness of networks with respect to such effects. A network being sensitive (A) and (B) in the approach according to (i), (ii) and (iii) may have a high gross throughput (ACKed and NACKed transmissions) but only a small portion of ACKed net throughput (ACKed transmissions). Even the available net throughput may not be usable by the RLC layer since the HARQ scheme may be broken by soft bit buffer corruption.

The HSUPA user experience can be pretty bad depending on the robustness of the network with respect to the (A), (B) and (C) since the HSUPA throughput may be severely limited or even a connection failure may happen.

In the following, an approach is described which can be seen to take dependencies between TX (transmitter) and RX (receiver) related HSUPA information into account. For example, it may consider that data transmitted in a certain TTI before a transmission gap cannot receive an ACK (acknowledge) because the corresponding HICH reception overlaps with the transmission gap. It may also exclude any false ACK reception for a HICH reception corresponding to a transmission falling within the transmission gap and avoid transmissions when the terminal's mobile transmission power has not yet been settled. Thus, it allows handling the above issues mentioned in context of the approach described with reference to FIG. 2. The approach described in the following can be seen to take the HARQ principle into account to extend the HSUPA-DVP handling. Specifically, it can be seen to consider the DVP gap not only during the DVP gap for HSUPA handling but also before and after the DVP gap to consider the synchronous HARQ inherent memory.

Figure 3:
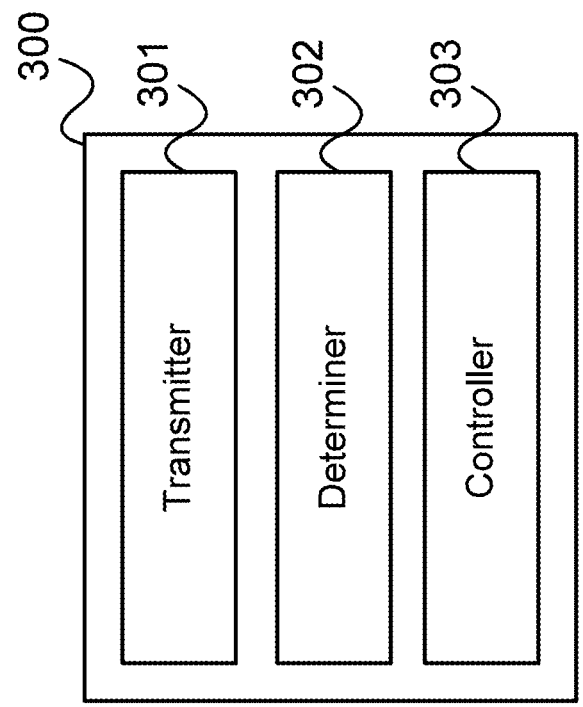
FIG. 3 shows a communication device.

FIG. 3 shows a communication device 300.

The communication device 300 includes a transmitter 301 configured to transmit data according to a retransmission protocol.

The communication device 300 further includes a determiner 302 configured to determine whether, for a transmission time scheduled according to the retransmission protocol, there was a transmission gap within a predetermined time interval before the transmission time or to determine whether there will be a transmission gap within a predetermined time interval after the transmission time.

Furthermore, the communication device 300 includes a controller 303 configured to control the transmitter 301 to perform an initial transmission of data or a retransmission of data according to the retransmission protocol at the transmission time based on the result of the determination.

In other words, a communication device considers in the decision about whether to perform an initial transmission in a retransmission process according to a retransmission protocol (e.g. a HARQ process according to HARQ), a retransmission or no transmission at all at a certain transmission time (e.g. a TTI) whether there is a preceding or subsequent transmission gap that might for example have interfered with a previous data transmission or acknowledgement reception or may interfere with a current or following data transmission or acknowledgement reception. The communication device may also determine whether there was a transmission gap within a predetermined time interval before the transmission time and whether there will be a transmission gap after the transmission time. For example, the communication device may include a first determiner configured to determine whether there was a transmission gap within a first predetermined time interval before the transmission time and a second determiner configured to determine whether there will be a transmission gap within a second predetermined time interval after the transmission time. It may then decide to perform a retransmission or a transmission based on the result of one or both of the determinations.

For example, the communication device may, in a HSUPA context as described above with reference to FIG. 2, address (A), (B) and (C) as mentioned above as follows:

(A) The communication device avoids futile initial transmissions before a DVP transmission gap to have a more robust HARQ. This means that when a transmission gap follows, the communication device does not perform an initial transmission.

(B) The communication device avoids false ACK detections after the DVP transmission gap to have a more robust HARQ. This means that when there has been a preceding transmission gap, the communication device is assumed that the transmission has not been successful so the communication device decides to perform a retransmission instead of an initial transmission of new data.

(C) The communication device avoids initial transmissions shortly after a DVP gap without stabilized TX power control to have a more robust HARQ. This means that the communication device decides not to perform an initial transmission during a certain time period after a transmission gap.

This approach allows improving the HSUPA user experience in that, for example, a higher HSUPA throughput and lower connection failure rate can be achieved.

A determination whether there will be a transmission gap within a predetermined time interval after the transmission time can be understood as a determination whether a transmission gap is scheduled within the predetermined time interval after the transmission time.

The communication device may be a communication terminal but may also be a communication device on the network side of a communication network, e.g. a base station.

The components of the communication device (e.g. the transmitter, the determiner and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The communication device for example carries out a method as illustrated in FIG. 4.

FIG. 4 shows a flow diagram 400 illustrating a method for transmitting data in accordance with a retransmission protocol, for example carried out by a communication device.

In 401, the communication device determines, for a transmission time scheduled according to a retransmission protocol, whether there was a transmission gap within a predetermined time interval before the transmission time or determines whether there will be a transmission gap within a predetermined time interval after the transmission time.

In 402, the communication device performs an initial transmission of data or a retransmission of data according to the retransmission protocol at the transmission time based on the result of the determination.

The following examples pertain to further embodiments

Example 1 is a communication device as illustrated in FIG. 3.

In Example 2, the subject matter of Example 1 may further include the determiner being configured to determine whether whether there was a transmission gap within a predetermined time interval before the transmission time and the controller being configured to control the transmitter to avoid an initial transmission of data at the transmission time if there was a transmission gap within the predetermined time interval before the transmission time.

In Example 3, the subject matter of Example 2 may further include the predetermined time interval including an earlier transmission time according to the retransmission protocol.

In Example 4, the subject matter of Examples 3 may further include the controller being configured to control the transmitter to perform a retransmission of data transmitted at the earlier transmission time if there was a transmission gap within the predetermined time interval before the transmission time.

In Example 5, the subject matter of any one of Examples 2-4 may further include the predetermined time interval being a guard interval.

In Example 6, the subject matter of Example 5 may further include the controller being configured to control the transmitter to perform a retransmission of data or no transmission of data at the transmission time.

In Example 7, the subject matter of any one of Examples 1-6 may further include the determiner being configured to determine whether whether there will be a transmission gap within a predetermined time interval after the transmission time and the controller being configured to control the transmitter to avoid an initial transmission of data at the transmission time if there will be a transmission gap within the predetermined time interval after the transmission time.

In Example 8, the subject matter of Example 7 may further include the controller being configured to control the transmitter to perform a retransmission of data or no transmission of data at the transmission time if there will be a transmission gap within a predetermined time interval after the transmission time.

In Example 9, the subject matter of any one of Examples 7-8 may further include the predetermined time interval including an acknowledgement reception time for data transmitted at the transmission time according to the retransmission protocol.

In Example 10, the subject matter of any one of Examples 1-9 may further include the transmitter being configured to transmit the data via a communication channel.

In Example 11, the subject matter of any one of Examples 1-10 may further include the transmitter not being enabled to transmit data via the communication channel during the transmission gap.

In Example 12, the subject matter of any one of Examples 1-11 may further include the communication device being a communication terminal and the transmitter being configured to transmit the data via an uplink channel.

In Example 13, the subject matter of any one of Examples 1-12 may further include a receiver configured to receive acknowledgments according to the retransmission protocol.

In Example 14, the subject matter of Example 13 may further include the receiver being configured to receive the acknowledgments via an indicator channel.

In Example 15, the subject matter of Example 14 may further include the receiver not being enabled to receive acknowledgments via the indicator channel during the transmission gap.

In Example 16, the subject matter of any one of Examples 1-15 may further include the communication device being a communication terminal comprising a first subscriber identity module and a second subscriber identity module and the data being to be transmitted for a communication connection used by means of the first subscriber identity module and the transmission gap being a transmission gap to allow reception of data addressed to the communication terminal by means of the second subscriber identity module.

In Example 17, the subject matter of Example 16 may further include the transmission gap being a transmission gap to allow reception of a paging message for the second subscriber identity module.

Example 18 is a method for transmitting data in accordance with a retransmission protocol according to FIG. 4.

In Example 19, the subject matter of Example 18 may further include determining whether there was a transmission gap within a predetermined time interval before the transmission time and avoiding an initial transmission of data at the transmission time if there was a transmission gap within the predetermined time interval before the transmission time.

In Example 20, the subject matter of Example 19 may further include the predetermined time interval including an earlier transmission time according to the retransmission protocol.

In Example 21, the subject matter of Example 20 may further include performing a retransmission of data transmitted at the earlier transmission time if there was a transmission gap within the predetermined time interval before the transmission time.

In Example 22, the subject matter of any one of Examples 19-21 may further include the predetermined time interval being a guard interval.

In Example 23, the subject matter of Example 22 may further include performing a retransmission of data or no transmission of data at the transmission time.

In Example 24, the subject matter of any one of Examples 18-23 may further include determining whether there will be a transmission gap within a predetermined time interval after the transmission time and controlling the transmitter to avoid an initial transmission of data at the transmission time if there will be a transmission gap within the predetermined time interval after the transmission time.

In Example 25, the subject matter of Example 24 may further include performing a retransmission of data or no transmission of data at the transmission time if there will be a transmission gap within a predetermined time interval after the transmission time.

In Example 26, the subject matter of any one of Examples 24-25 may further include the predetermined time interval including an acknowledgement reception time for data transmitted at the transmission time according to the retransmission protocol.

In Example 27, the subject matter of any one of Examples 18-26 may further include transmitting the data via a communication channel.

In Example 28, the subject matter of any one of Examples 18-27 may further include transmission of data via the communication channel not being enabled during the transmission gap.

In Example 29, the subject matter of any one of Examples 18-28 may further include transmitting the data via an uplink channel.

In Example 30, the subject matter of any one of Examples 18-29 may further include receiving acknowledgments according to the retransmission protocol.

In Example 31, the subject matter of Example 30 may further include receiving the acknowledgments via an indicator channel.

In Example 32, the subject matter of Example 31 may further include the receiver not being enabled to receive acknowledgments via the indicator channel during the transmission gap.

In Example 33, the subject matter of any one of Examples 18-32 may further include the data being to be transmitted for a communication connection used by means of a first subscriber identity module of a communication terminal and the transmission gap being a transmission gap to allow reception of data addressed to the communication terminal by means of a second subscriber identity module.

In Example 34, the subject matter of Examples 33 may further include the transmission gap being a transmission gap to allow reception of a paging message for the second subscriber identity module.

Example 35 is a computer readable medium having instructions recorded thereon which, when carried out by a processor, make the processor perform a method for transmitting data in accordance with a retransmission protocol of any one of Examples 18 to 34.

Example 36 is a communication device comprising a transmitting means for transmitting data according to a retransmission protocol, a determining means for determining, for a transmission time scheduled according to the retransmission protocol, there was a transmission gap within a predetermined time interval before the transmission time or for determining whether there will be a transmission gap within a predetermined time interval after the transmission time and a controlling means for controlling the transmitting means to perform an initial transmission of data or a retransmission of data according to the retransmission protocol at the transmission time based on the result of the determination.

In Example 37, the subject matter of Example 36 may further include the determining means being for determining whether there was a transmission gap within a predetermined time interval before the transmission time and the controlling means being for controlling the transmitting means to avoid an initial transmission of data at the transmission time if there was a transmission gap within the predetermined time interval before the transmission time.

In Example 38, the subject matter of Example 37 may further include the predetermined time interval including an earlier transmission time according to the retransmission protocol.

In Example 39, the subject matter of Example 38 may further include the controlling means being for controlling the transmitting means to perform a retransmission of data transmitted at the earlier transmission time if there was a transmission gap within the predetermined time interval before the transmission time.

In Example 40, the subject matter of any one of Examples 37-39 may further include the predetermined time interval being a guard interval.

In Example 41, the subject matter of Example 40 may further include the controlling means being for controlling the transmitting means to perform a retransmission of data or no transmission of data at the transmission time.

In Example 42, the subject matter of any one of Examples 36-41 may further include the determining means being for determining whether there will be a transmission gap within a predetermined time interval after the transmission time and the controlling means being for controlling the transmitting means to avoid an initial transmission of data at the transmission time if there will be a transmission gap within the predetermined time interval after the transmission time.

In Example 43, the subject matter of Example 42 may further include the controlling means being for controlling the transmitting means to perform a retransmission of data or no transmission of data at the transmission time if there will be a transmission gap within a predetermined time interval after the transmission time.

In Example 44, the subject matter of Examples 43 may further include the predetermined time interval including an acknowledgement reception time for data transmitted at the transmission time according to the retransmission protocol.

In Example 45, the subject matter of any one of Examples 36-44 may further include the transmitting means being for transmitting the data via a communication channel.

In Example 46, the subject matter of any one of Examples 36-45 may further include the transmitting means not being enabled to transmit data via the communication channel during the transmission gap.

In Example 47, the subject matter of any one of Examples 36-46 may further include the communication device being a communication terminal and the transmitting means being for transmitting the data via an uplink channel.

In Example 48, the subject matter of any one of Examples 36-47 may further include a receiving means for receiving acknowledgments according to the retransmission protocol.

In Example 49, the subject matter of Example 48 may further include the receiving means being for receiving the acknowledgments via an indicator channel.

In Example 50, the subject matter of any one of Examples 36-49 may further include the receiving means not being enabled to receive acknowledgments via the indicator channel during the transmission gap.

In Example 51, the subject matter of any one of Examples 36-50 may further include the communication device being a communication terminal comprising a first subscriber identity module and a second subscriber identity module and the data being to be transmitted for a communication connection used by means of the first subscriber identity module and the transmission gap being a transmission gap to allow reception of data addressed to the communication terminal by means of the second subscriber identity module.

In Example 52, the subject matter of Examples 51 may further include the transmission gap being a transmission gap to allow reception of a paging message for the second subscriber identity module.

It should be noted that one or more of the features of any of the examples above may be combined with any one of the other examples.

In the following, examples are described in more detail. Specifically, an example of a behavior of a mobile terminal in a HSUPA data transmission scenario similar to the one of FIG. 2 is described. In particular, the following example is described for a 3G (Third Generation) communication system (since HSUPA is a 3G uplink data channel). The described approaches may be similarly applied to other communication systems, such as according to LTE.

FIG. 5 shows a transmission diagram 500 illustrating a HSUPA data transmission in the presence of a DVP transmission gap 503 which is considered by the mobile terminal for TTIs following and preceding the transmission gap.

Similar to FIG. 2, the transmission diagram 500 shows, along a top sub-diagram 501, the activity of the transmitter of the mobile terminal on the EDCH (Enhanced Uplink Dedicated Channel) and, along a second sub-diagram 502, the activity of the receiver of the mobile terminal on the HICH. Time flows from left to right in FIG. 5.

Similar to the transmission flow in FIG. 2, an initial transmission during the transmission gap 503 is avoided, as illustrated by a first transmission 504, and a retransmission during the transmission gap 503 is performed with zero TX power as illustrated by a second transmission 505.

In contrast to the transmission flow described with reference to FIG. 2, for a data transmission that precedes the transmission gap 503, as illustrated by a third data transmission 507, for which the corresponding HICH reception 506 falls within the transmission gap 503, the mobile terminal detects this and only performs the data transmission when it is a retransmission. In other words, in this example, the mobile terminal determines, for the TTI of the third data transmission 507, whether a transmission gap follows within a period (or time interval) such that the corresponding HICH reception 506 falls within the transmission gap and, since this is the case, it decides to only perform the data transmission if it is a retransmission.

Further, in contrast to the transmission flow described with reference to FIG. 2, if a transmission during the gap 503 was suppressed (in this example the second transmission 505) the corresponding HICH reception after the gap 503, in this example a second reception 508 is forced to report a NACK. In other words, the mobile terminal determines, for a TTI (in this case the TTI corresponding to a third transmission 509) whether there was a transmission gap within a period (or time interval) of the TTI such that the preceding data transmission (belonging to the same HARQ process) has fallen within the transmission gap 503. If this is the case, the mobile terminal considers to have received a NACK for this HARQ process and thus, for example, does not perform an initial transmission but a retransmission at the TTI.

Furthermore, in contrast to the transmission flow described with reference to FIG. 2, the mobile terminal introduces a guard interval 510 after the transmission gap 503. In other words, the mobile terminal determines, for a TTI (in this case the TTI corresponding to a fifth transmission 511) whether there was a transmission gap within a period (or time interval) of the TTI such that the TTI falls within the guard interval 510 for the transmission gap. If this is the case and if the transmission for the TTI is an initial transmission, the mobile terminal shifts the transmission to a later TTI, as illustrated by a sixth transmission 512. Thus, the mobile terminal prohibits initial transmissions during the guard interval 510. It may, however, allow a retransmission during the guard interval since there may be redundancy from the earlier transmissions such that a low transmission performance due to the TX power of the handset not yet being stabilized may be overcome.

In summary, in relation to issues (A), (B) and (C) above, the mobile terminal has, according to the example illustrated in FIG. 5, the following behavior:

(A) The mobile terminal (e.g. a transmission controller of the mobile terminal) prohibits an initial transmission before a DVP gap (not only during the DVP gap) when the corresponding following HICH reception overlaps with the DVP gap.

(B) The mobile terminal forces any HICH reception that corresponds to a TTI transmission having zero power during the gap to be considered as a NACK irrespectively from the received HICH signal.

C) The mobile terminal prohibits any initial transmission after the DVP gap for a certain guard interval to allow the network to stabilize the TX power of the handset.

The behavior of the mobile terminal illustrated in FIG. 5 allows a more robust HARQ scheme having much less difference between gross and net throughput. In addition, tests show that the physical layer net throughput can be used by RLC layer and finally as TCP/IP data throughput seen by the user.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for transmitting data in accordance with a retransmission protocol comprising:
configuring a receiver to operate with a first subscriber identity module ("SIM"), the receiver's operation with the first SIM precluding operation with a second SIM;
operating the receiver for use with the first SIM;
scheduling a transmission gap, during which the receiver will operate with the second SIM and will be precluded from operating with the first SIM;

restricting transmission for the first SIM to a retransmission, and precluding an initial transmission, within a predetermined period before the transmission gap;

implementing the transmission gap, during which the receiver operates with the second SIM and is precluded from operating with the first SIM;

determining whether a corresponding acknowledgement or non-acknowledgement for the retransmission before the transmission gap will fall within the transmission gap;

registering a default non-acknowledgement for the retransmission, wherein an expected time of receipt for an acknowledgement or non-acknowledgement falls within the transmission gap for the first SIM; and suppressing the retransmission, wherein a response to the default non-acknowledgement is scheduled within the transmission gap.

2. The method of claim 1, further disclosing preventing an initial transmission within a predetermined time interval after the transmission gap.

3. The method of claim 1, further comprising determining whether a transmission gap occurred within a predetermined time interval before a transmission time.

4. The method of claim 1, further comprising instituting a guard interval following the transmission gap, such that no transmission or retransmission is performed during the guard interval.

5. The method of claim 4, further comprising a length of the guard interval being a length of the predetermined period.

6. The method of claim 1, further comprising calculating an expected time of receipt for an acknowledgement or non-acknowledgement of a retransmission transmitted within a predetermined period before the transmission gap.

7. A communication device, comprising:
a transmitter, configured for transmitting signals over a wireless link;
a determiner, configured to schedule transmissions;
a controller, configured to operate a transmitter and receiver;

wherein the controller operates the receiver for use with a first subscriber identity module ("SIM"), the receiver's operation with the first SIM precluding operation with a second SIM;

the determiner schedules a transmission gap, during which the receiver will operate with the second SIM and will be precluded from operating with the first SIM;

the determiner restricts transmission for the first SIM to a retransmission and precludes an initial transmission within a predetermined period before the transmission gap;

the determiner implements the transmission gap, during which the receiver operates with the second SIM and is precluded from operating with the first SIM;

the determiner determines whether a corresponding acknowledgement or non-acknowledgement for the retransmission before the transmission gap will fall within the transmission gap;

the determiner registers a default non-acknowledgement for the retransmission, wherein an expected time of receipt for an acknowledgement or non-acknowledgement falls within the transmission gap for the first SIM;

the controller suppresses the retransmission, wherein a response to the default non-acknowledgement is scheduled within the transmission gap.

8. The communication device of claim 6, further comprising the communication device being a communication terminal.

9. The communication device of claim 6, further comprising the communication device being on a network side of a communication network.

10. The communication device of claim 6, further comprising the communication device being a base station.

11. The communication device of claim 6, further comprising the transmitter, determiner, and controller being hard-wired logic circuits.

12. The communication device of claim 6, further comprising the transmitter, determiner, and controller being programmable logic circuits.

13. The communication device of claim 6, further comprising the transmitter, determiner, and controller being a processor executing software.

* * * * *

UNITED STATES PATENT AND TRADEMARK OFFICE
CERTIFICATE OF CORRECTION

PATENT NO. : 10,003,990 B2
APPLICATION NO. : 14/314042
DATED : June 19, 2018
INVENTOR(S) : Scholand et al.

Page 1 of 1

It is certified that error appears in the above-identified patent and that said Letters Patent is hereby corrected as shown below:

In the Claims

Column 14, Line 25: Please replace "6" between "claim" and "further" with "7";

Column 14, Line 28: Please replace "6" between "claim" and "further" with "7";

Column 14, Line 31: Please replace "6" between "claim" and "further" with "7";

Column 14, Line 33: Please replace "6" between "claim" and "further" with "7";

Column 14, Line 36: Please replace "6" between "claim" and "further" with "7";

Column 14, Line 39: Please replace "6" between "claim" and "further" with "7".

<div style="text-align:center">
Signed and Sealed this
Twenty-first Day of August, 2018

Andrei Iancu
*Director of the United States Patent and Trademark Office*
</div>